United States Patent [19]

Olrik

[11] Patent Number: 4,822,455

[45] Date of Patent: Apr. 18, 1989

[54] DISTILLING AND DESALINATION APPARATUS

[75] Inventor: Henrik-Gerner Olrik, Humlebaek, Denmark

[73] Assignee: Chas. Hude, Copenhagen, Denmark

[21] Appl. No.: 1,160

[22] Filed: Jan. 7, 1987

[30] Foreign Application Priority Data

Jan. 8, 1986 [DK] Denmark .................................. 78/86

[51] Int. Cl.⁴ .............................................. B01D 1/22
[52] U.S. Cl. .................... 202/236; 202/238; 203/89; 203/DIG. 4; 159/6.1; 159/13.1; 159/49; 159/DIG. 42
[58] Field of Search ....................... 202/236, 238, 185.1, 202/235; 203/89, DIG. 4; 159/13.1, 6.1, 49, DIG. 42

[56] References Cited

U.S. PATENT DOCUMENTS

| | | | |
|---|---|---|---|
| 2,855,345 | 10/1958 | Mares | 202/236 |
| 3,136,707 | 6/1964 | Hickman | 202/236 |
| 3,347,754 | 10/1967 | Thomas | 202/238 |
| 3,507,752 | 4/1970 | Germerdonk | 202/236 |
| 3,567,589 | 3/1971 | Javet | 159/6.1 |
| 3,567,591 | 3/1971 | Othmer | 159/DIG. 17 |
| 3,568,766 | 3/1971 | Thomas | 202/236 |
| 3,637,465 | 1/1972 | Wilson | 202/236 |
| 3,640,330 | 2/1972 | Javet | 202/236 |
| 3,692,634 | 9/1972 | Othmer | 159/DIG. 17 |
| 3,725,209 | 4/1973 | Rosa | 159/6.1 |
| 3,890,205 | 6/1975 | Schnitzer | 202/236 |
| 4,451,334 | 5/1984 | Ciocca et al. | 159/6.1 |

FOREIGN PATENT DOCUMENTS

| | | | |
|---|---|---|---|
| 2603480 | 8/1977 | Fed. Rep. of Germany | 159/6.1 |
| 0258265 | 10/1970 | U.S.S.R. | 159/903 |
| 0564191 | 9/1944 | United Kingdom | 159/6.1 |
| 0568387 | 4/1945 | United Kingdom | 159/6.1 |

Primary Examiner—David L. Lacey
Assistant Examiner—V. Manoharan
Attorney, Agent, or Firm—Saidman, Sterne, Kessler & Goldstein

[57] ABSTRACT

A distilling and desalination apparatus comprising an evaporation chamber and a condensing chamber in which the evaporation chamber through a cooling circuit communicates by way of heat exchange with the condensing chamber and rotates in relation thereto. The evaporation chamber is constructed to form a thin fluid film on the inner surface of the evaporation chamber during rotation, surplus water being slung out along the edge and into channels and led tangentially to the rear by blades. The cooling circuit comprises a condensing portion and an evaporation portion, the fluid being evaporated along the inner surface of the coolant condensing portion, and fluid vapors being condensed along the outer surface of the coolant condensing portion, whereupon the drops of fluid are slung outwards and collected.

7 Claims, 7 Drawing Sheets

DISTILLING AND DESALINATION APPARATUS

BACKGROUND OF THE INVENTION

The invention relates to a distilling and desalination apparatus comprising an evaporation chamber and a condensing chamber.

DESCRIPTION OF THE PRIOR ART

U.S. patent specification No. 3,567,591 discloses an apparatus for multi-stage condensing of vapor in which the vapor is carried away and sucked up by a condensing and atomization unit. A drawback of this apparatus is that it is rather bulky.

Distilling units of the steam compressor type are also known but the lubricating abilities of these are not fully satisfactory.

SUMMARY OF THE INVENTION

The object of the invention is to provide a distilling apparatus which does not show these drawbacks and which is substantially smaller. An apparatus according to the invention is characterized in that the evaporation chamber through a cooling circuit communicates by way of heat exchange with the condensing chamber and rotates in relation thereto so that a thin fluid film is formed on the inner side of the evaporation chamber during rotation, surplus fluid being slung out along the edge, the surfaces on which evaporation takes place furthermore facing the center whereas the surfaces on which condensation takes place face away from the center, the cooling circuit comprising means for leading back the coolant. The thin fluid film permits a thin-film cooking (quick cooking) and such a thin-film cooking does not require great differences of temperature. Furthermore almost all condensing heat is utilized for the evaporation. This results in a higher efficiency than previously known.

In a particularly advantageous embodiment according to the invention, the cooling circuit comprises a coolant circuit comprising a condensing portion and an evaporation portion, the fluid being evaporated along the inner side of the coolant condensing portion and the fluid vapors being condensed along the outer side of the coolant condensing portion whereafter the condensed fluid drops are slung out. The cooling circuit comprises for instance a heat-conducting pot surrounding the fluid evaporation chamber, said pot being kept thermally insulated from the remainder of cooling circuit by means of a thermal insulating body, said body comprising channels for establishing a pressure difference and condensation of the coolant.

The channels according to the invention may furthermore end in a preferably circumferential condensing portion ending in a preferably circumferential fluid seal serving as a barrier between the condensing portion and the evaporation portion, the preferably circumferential fluid seal being provided along the edge of the pot and shaped so as to maintain a certain pressure difference between the condensing and the evaporation portions, depending on the rotational velocity of the heat circuit. In this way the fluid seal functions as a valve maintaining a certain pressure difference between the condensing and the evaporation portions.

In order to avoid separate devices for filling the fluid seal during start, the fluid seal may be located in such a manner that it is automatically filled during start, for instance along the periphery whereby coolant will reach the seal by means of the gravitational effect.

The evaporation portion may furthermore comprise a stator for breaking the rotary movement of the vapor, said stator being stationary in relation to the rotating chamber. In this way it is easier to guide the vapor towards the center of the circulation circuit.

To avoid sealing problems the stator may be engaged with a fixed axle via a magnetic clutch.

A receiver for collecting surplus water may advantageously be fitted below the evaporation chamber as the surplus water is heated to evaporation temperature before the distilling process is started. In this way the starting phase is reduced to a minimum.

The evaporation surfaces according to the invention may comprise several preferably circumferential folds, a preferably circumferential guiding shield collecting the fluid and guiding it to the next fold being fitted in connection with each fold. As a result a large evaporation surface within the same diameter is obtained.

The condensing surface according to the invention may furthermore comprise several preferably circumferential folds collecting the fluid and guiding it to the next fold. A large condensing surface within the same diameter is consequently obtained.

The diameter of the distilling apparatus could be reduced if the water condensing surfaces are placed on top of the evaporation surfaces, means for leading back the condensed and evaporated coolant then being provided.

BRIEF DESCRIPTION OF THE DRAWING

The invention will be described more detailed in the following with reference to the accompanying drawing, in which.

DESCRIPTION OF THE PREFERRED EMBODIMENTS

Figure 1:
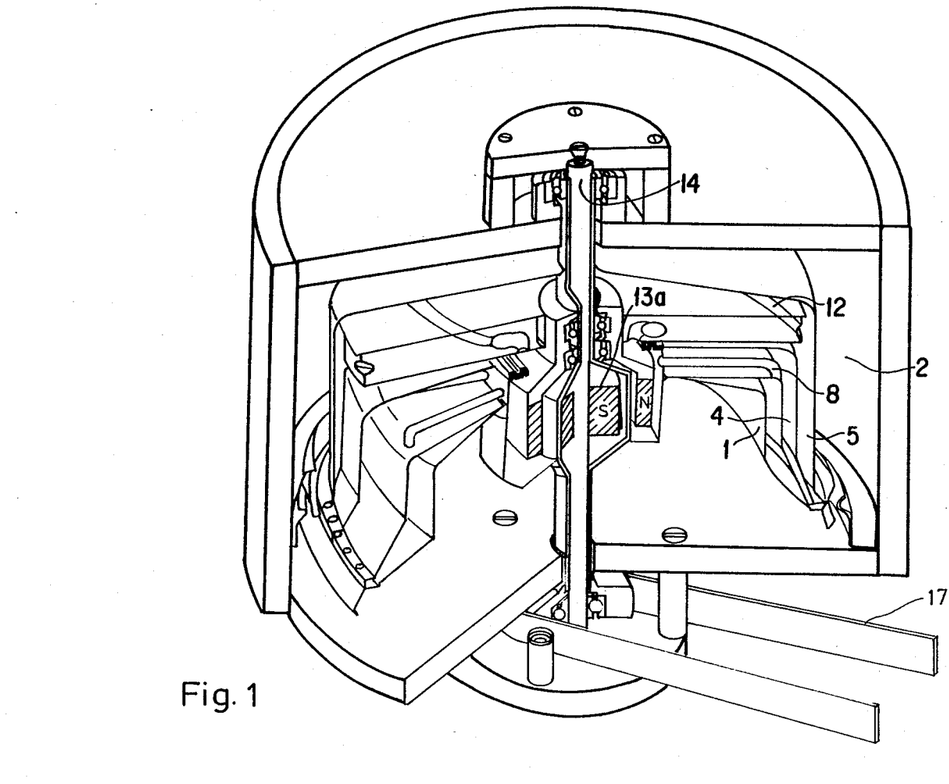
FIG. 1 shows the distilling and desalination apparatus according to the invention.
Figure 2:
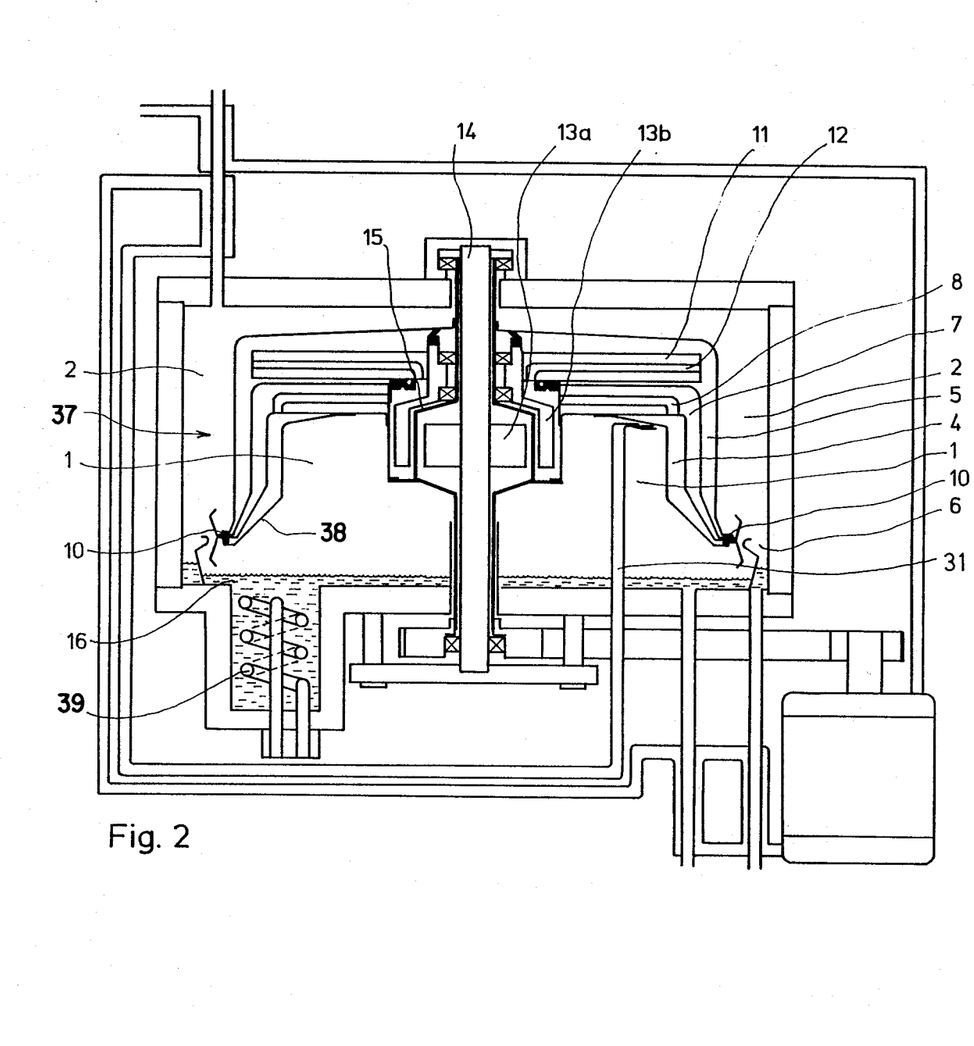
FIG. 2 is a sectional view through the distilling apparatus shown in FIG. 1.

The distilling and desalination apparatus shown in FIGS. 1 and 2 comprises an evaporation chamber 1 and a condensing chamber 2. The evaporation chamber rotates and communicates by way of heat exchange with the condensing chamber 2 via a cooling circuit 37. The cooling circuit 37 comprises a condensing portion 4 and an evaporation portion 5, the fluid to be distilled being evaporated along the inner surface of the coolant condensing portion 4 and the vapors of said fluid being condensed along the outer surface of the coolant evaporation portion 5. After condensation the fluid drops in question are slung out into a circumferential receiver 6 by centrifugal force. The coolant condensing portion 4 is kept thermally insulated from the coolant evaporation portion 5 by means of a thermal insulating body 7, said body 7 comprising channels 8 for establishing a pressure difference during rotation. The preferably radial channels 8 end in a preferably circumferential condensing portion 4 ending in a preferably circumferential fluid seal 10. The fluid seal serves as a barrier between the condensing portion 4 and the evaporation portion and is preferably provided along the edge of the pot and is shaped so as to maintain a certain pressure difference between the condensing and the evaporation portions, depending on the number of revolutions. In a preferred embodiment the fluid seal 10 is provided at the bottom—cf. FIG. 2—so that it does not have to be filled with coolant during start. In order to close the coolant circuit, the evaportion portion comprises a preferably stationary stator 11 for breaking the rotary movement of the vapors and leading back the vapors towards center. The stator 11 is constituted by a stationary body with helical channels 12. This body is fixed by a stationary axle 14 in the center via a magnetic clutch 13a, 13b. Between the parts of the magnetic clutch a ceramic body 15 is pivotally mounted on the stationary axle by means of bearings. The ceramic body 15 is thus able to rotate between the parts 13a, 13b of the magnetic clutch (without eddy current losses). The cooling circuit with the heat conducting pot 38 is firmly connected to the ceramic body 15 and can rotate therewith. The rotation is provided by means of a driving belt 17—cf. FIG. 1. When the cylindrical chamber rotates, a thin fluid film is formed on the inner surface of the chamber 1 during supply of an adequate amount of fluid via the pipe 31, the surplus fluid being slung out along the edge, (by centrifugal force), and into channels leading tangentially to the rear by means of special blades (shown at 37 in FIG. 5). Particularly preferred configurations of blades are shown in FIG. 6. The thin fluid film permits a quick cooking (thin-film cooking) whereas surplus water is collected at the bottom 16 of the evaporation chamber. The vapor is led to the other side of the cooling circuit where it is condensed and the condensed fluid drops are slung out. The surplus water has, however, in advance been heated to evaporation temperature (at 39°) so that no condensing of the vapors takes place there. As a result of the quick cooking the temperature in the condensing portion of the cooling circuit need not be much higher than the temperature in the evaporation portion. The difference of temperature is preferably a few degrees, yet growing with the number of revolutions. The number of revolutions is for instance 1500 rpm.

Figure 3:
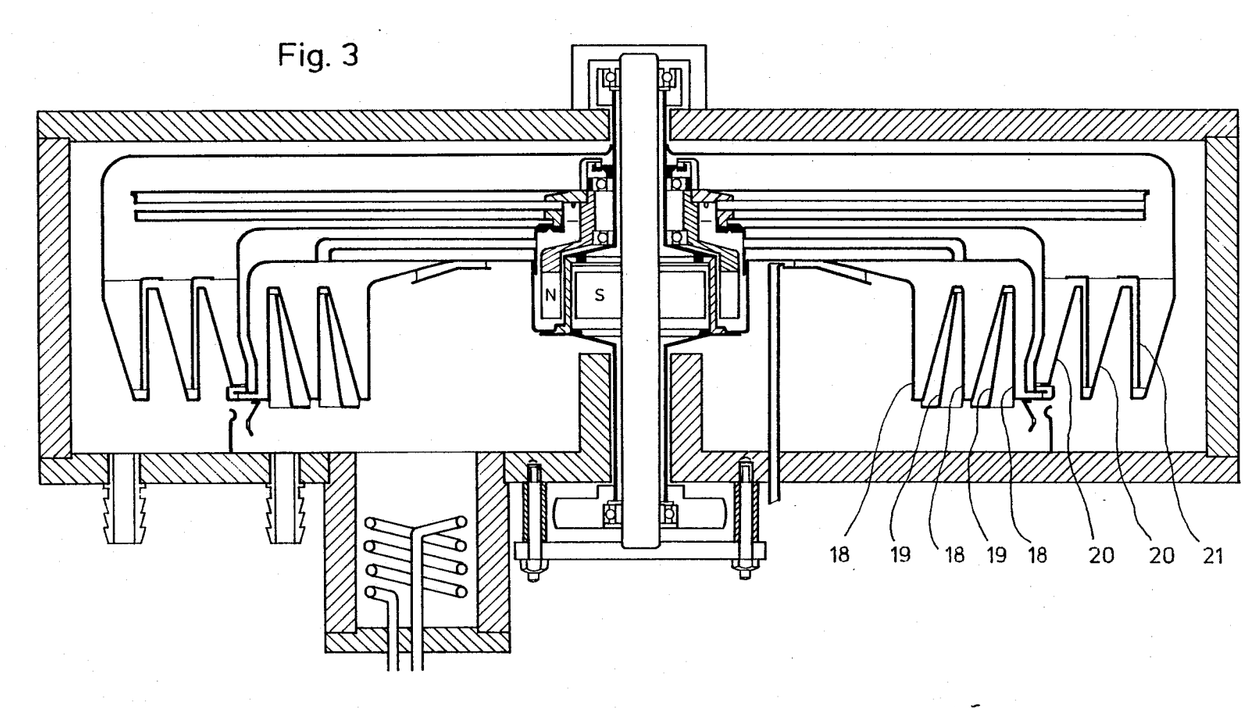
FIG. 3 illustrates an embodiment of the distilling apparatus, with a better utilization of the area.

In a particularly advantageous embodiment the evaporation surface comprises several preferably circumferential folds —cf. FIG. 3—, a preferably circumferential guiding shield 19 being fitted in connection with each fold 18. The guiding shields 19 collect the not yet evaporated fluid and lead it to the next fold 18. The condensing surface may also comprise several preferably circumferential folds 20 collecting the condensed coolant and via guiding shields 21 leading it on to a succeeding fold 20. These measures give a better utilization of area and volume within the same diameter.

Figure 4:
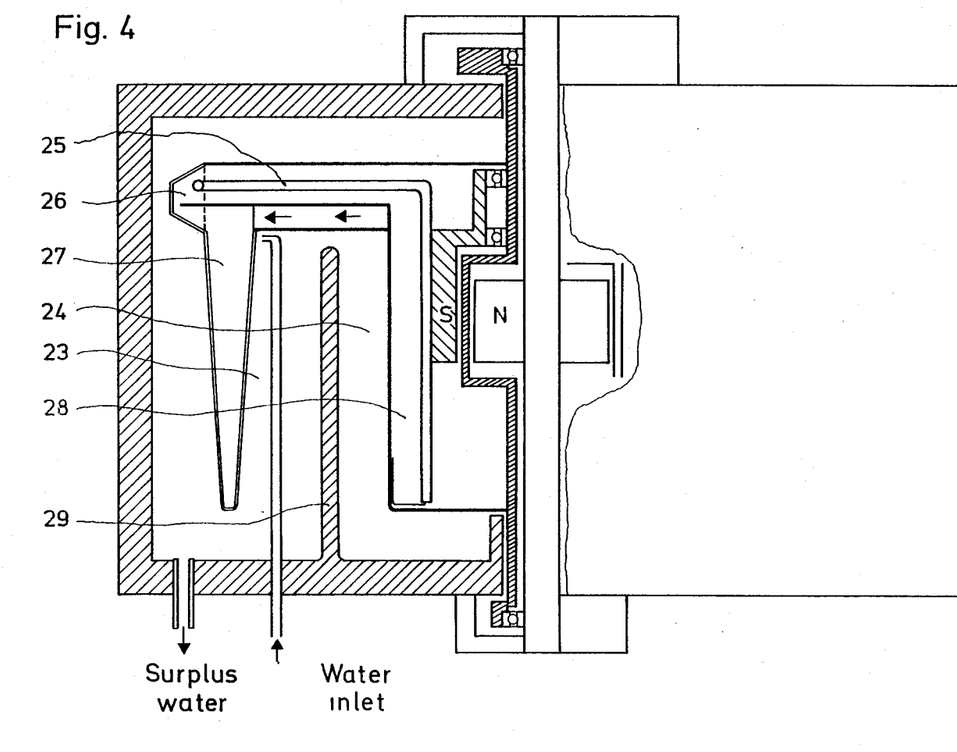
FIG. 4 shows an alternative embodiment of the distilling apparatus.

In an alternative embodiment the evaporation chamber 23 is fitted on the outside in relation to the condensing chamber 24—cf. FIG. 4—a stationary stator 25 for leading back the coolant being provided. The stator comprises stationary helical channels which during rotation lead coolant back from the fluid seal. The fluid seal is provided along the periphery and is by means of the centrifugal force automatically established when the apparatus is started. When the distilling apparatus is working, water is supplied from the bottom. The water forms a thin film along the inner surface of the condensing portion 27. Surplus water is delivered along the edge at the bottom, whereas the vapor is led to the outer surface of the evaporation portion 28 where the condensing of the vapors can take place. The condensed fluid can be delivered through an opening in the bottom. Also in this case the surfaces on which evaporation takes place face the center whereas the surfaces on which condensing takes place face away from center. The distilled fluid is kept separate from the surplus fluid by a circumferential partition 29.

Figure 5:
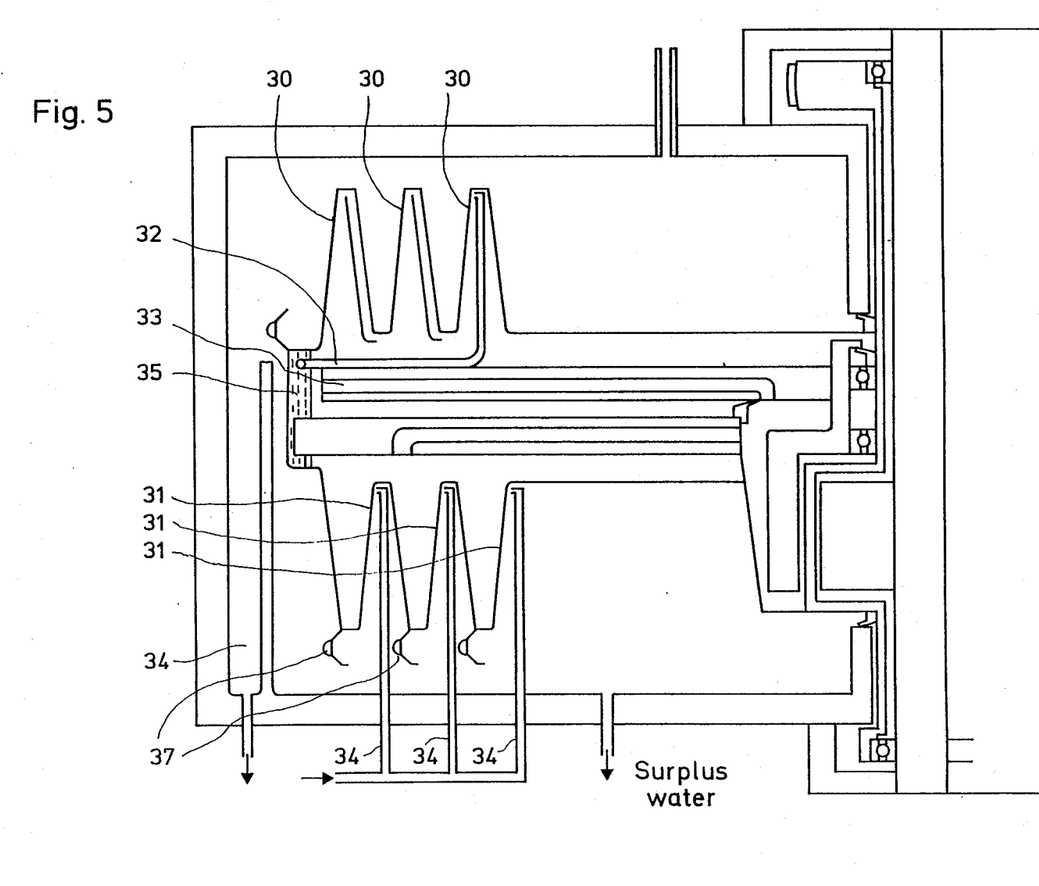
FIG. 5 illustrates an embodiment of the distilling apparatus, in which the evaporation portion is fitted on top of the condensing portion.
Figure 6:
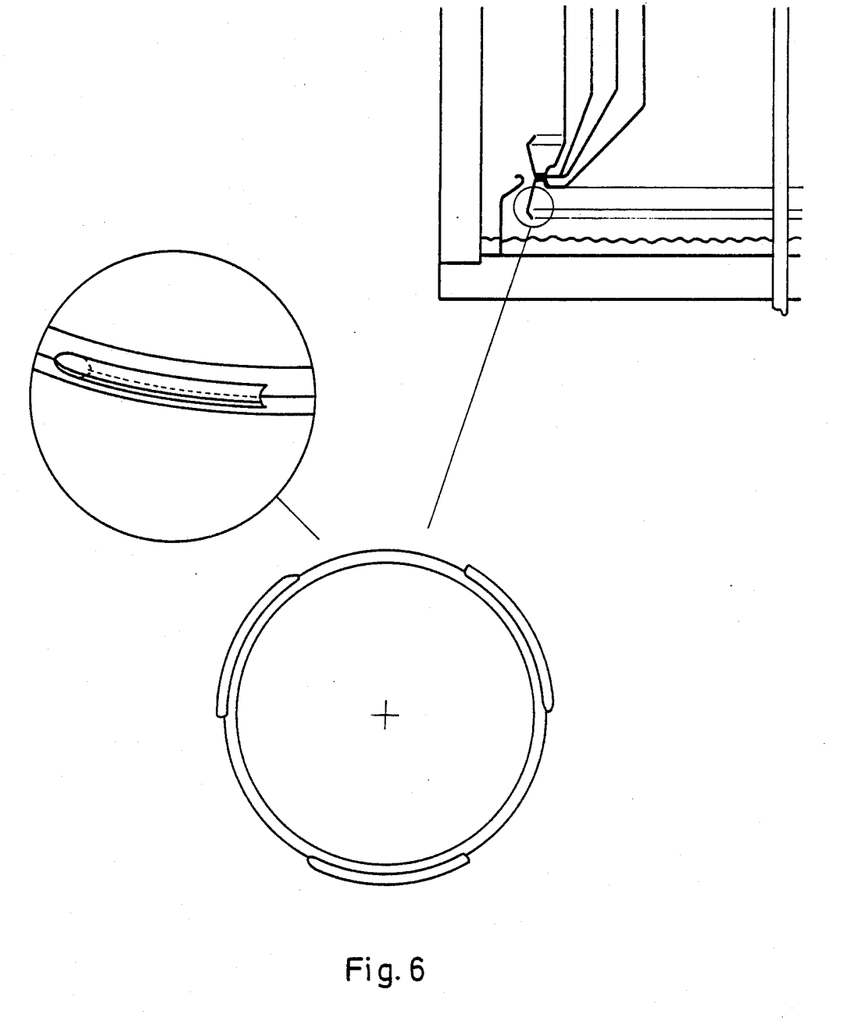
FIG. 6 illustrates a number of channels through which surplus fluid is delivered.
Figure 7:
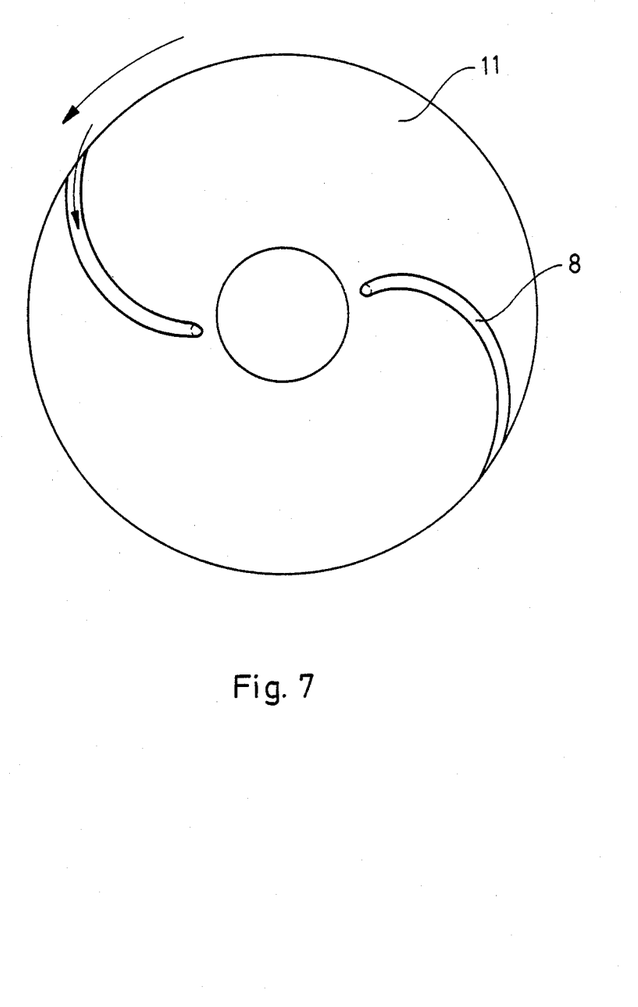
FIG. 7 is a horizontal sectional view through the stationary stator for breaking and leading back evaporated coolant.

FIG. 5 shows a further development of the embodiment shown in FIG. 3 in which the condensing surfaces 30 lie on top of or below the evaporation surfaces 31. In this case both means 32 for leading back condensed coolant as well as means 33 for leading back evaporated coolant are provided. The fluid is supplied from the bottom through a number of pipes 34. The fluid delivered forms a thin film along the inner surface of one of the folds 31 of the condensing portion, the surplus fluid being delivered along the edge at the bottom. The evaporated fluid is led up to the superjacent evaporation portion in which the fluid vapors are condensed into drops which are slung out and collected in a circumferential receiver 6. The condensing surface may also comprise several folds 30, thus achieving a better utilization of the area. The coolant is led to the folds 30 by means of stationary leading back channels as in FIG. 4. In this case, the fluid seal 35 is provided along the periphery so that it is automatically established during start.

A distilling apparatus having a diameter of about 50 cm is able to distill about 15 liters of water per hour at a number of revolutions of 1500 rpm.

The distilling apparatus is primarily intended for ordinary distilling but can possibly gain ground in connection with desalination of sea water and purifying of polluted drinking water and in the chemical industry. The chemical industry can also utilize the controlled concentrating effect of the inventive apparatus.

The fluid seal in the coolant circuit may be replaced by a number of U-shaped channels or pipes placed along the periphery.

The stator for leading back evaporated coolant does not necessarily have to be stationary. It can e.g. be propelled by a separate electric motor thus achieving a faster leading back.

I claim:

1. A distilling apparatus comprising:
   (a) an evaporation chamber;
   (b) a condensing chamber;
   (c) means for feeding fluid to be evaporated to said evaporation chamber;
   (d) heating means disposed within said evaporation chamber whereby evaporated fluid is heated;
   (e) cooling circuit means rotatably mounted between said evaporation chamber and said condensing chamber, and in heat exchange communication with each of said chambers, said cooling circuit means comprising a first and a second surface means;
   (f) a coolant condensing means disposed between said first and second surface means;
   (g) a coolant evaporation means disposed between said first and second surface means adjacent said coolant condensing means;

(h) a conduit means for conveying evaporated coolant from said coolant evaporation means to said coolant condensing means;

(i) a heat conducting pot covering said evaporation chamber;

(j) thermal insulating means for keeping said heat conducting pot thermally insulated from the remainder of said cooling circuit, said thermal insulating means including channels for establishing a pressure difference between said coolant condensing and evaporation means;

(k) a fluid seal provided along the edge of said heat conducting pot for serving as a barrier between the coolant condensing means and the evaporation means; and (l) means for depositing a thin film of fluid on said first surface means;

whereby when said cooling circuit means is rotated, unevaporated fluid is urged away from said first surface means by centrifugal force and condensed fluid is urged away from said second surface means by centrifugal force.

2. A distilling apparatus as claimed in claim 1 wherein the coolant evaporation means comprises a stator for breaking rotary movement within said coolant evaporation means, said stator being stationary in relation to the remainder of said coolant evaporation means.

3. A distilling apparatus as claimed in claim 2, wherein the stator is engaged with a fixed axle via a magnetic clutch.

4. A distilling apparatus as claimed in claim 1, further comprising a receiver for collecting unevaporated fluid disposed below the evaporation chamber.

5. A distilling apparatus as claimed in claim 1, wherein said second surface means is above the first surface means.

6. A distilling apparatus as claimed in claim 1 wherein said first surface means comprises a plurality of circumferential folds and a circumferential guiding shield, and said guiding shield is fitted in connection with each fold for collecting fluid and guiding it to the next fold.

7. A distilling apparatus as claimed in claim 1, wherein said second means comprises a plurality of circumferential folds for collecting fluid and guiding it to the next fold.

* * * * *

UNITED STATES PATENT AND TRADEMARK OFFICE
CERTIFICATE OF CORRECTION

PATENT NO. : 4,822,455
DATED : April 18, 1989
INVENTOR(S) : Henrik-Gerner Olrik

It is certified that error appears in the above—identified patent and that said Letters Patent is hereby corrected as shown below:

On the title page delete

"Assignee: Chas. Hude, Copenhagen, Denmark".

Signed and Sealed this

Twenty-seventh Day of February, 1990

Attest:

JEFFREY M. SAMUELS

Attesting Officer     Acting Commissioner of Patents and Trademarks